March 25, 1958    H. A. RONNINGEN ET AL    2,828,017
AUTOMATIC BACKWASHING FILTER Filed March 16, 1954    4 Sheets-Sheet 1

INVENTORS
HELMER A. RONNINGEN
ROBERT M. RONNINGEN
BY WILLIAM J. PETTER

ATTORNEYS

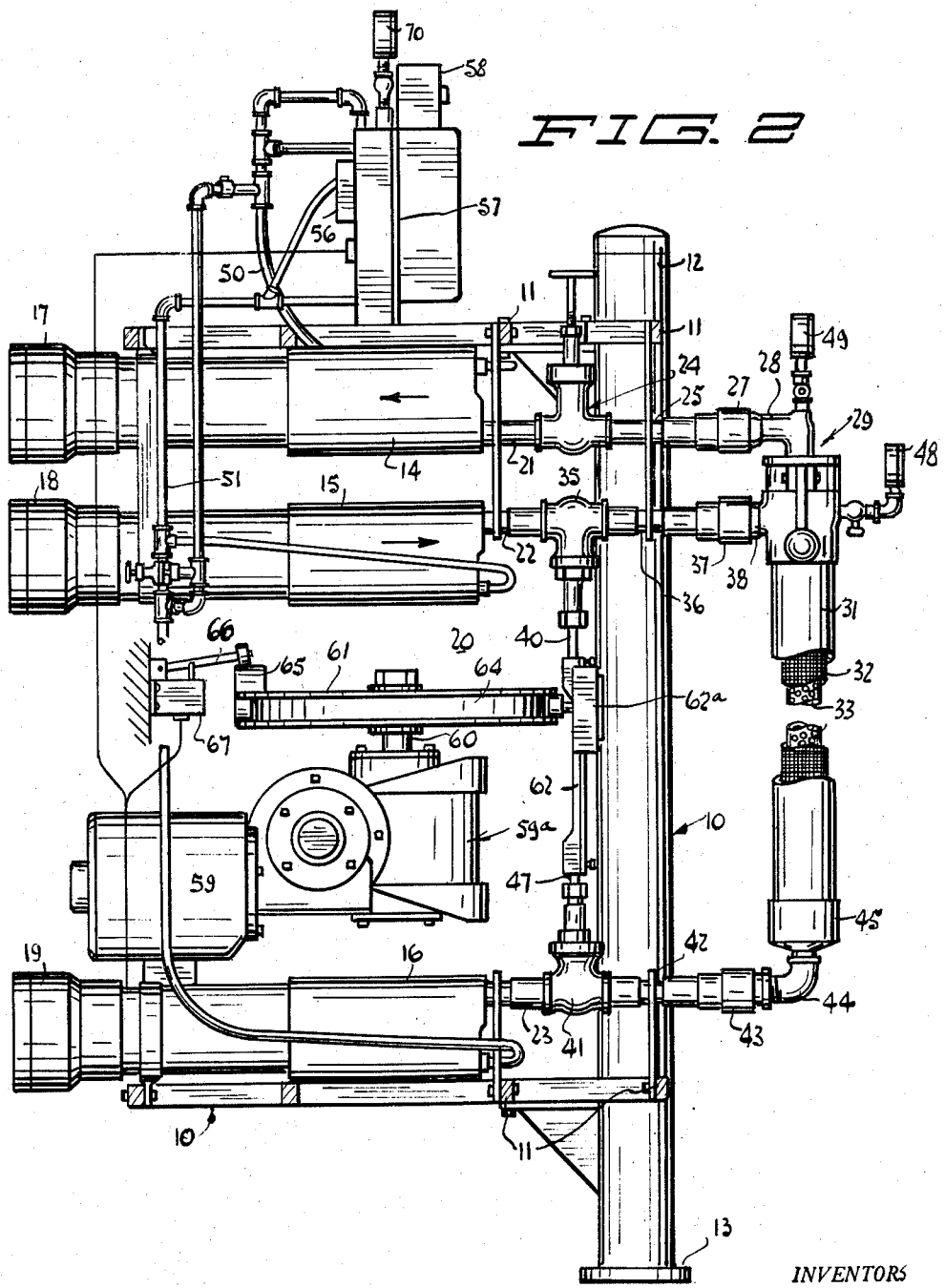

March 25, 1958  H. A. RONNINGEN ET AL  2,828,017
AUTOMATIC BACKWASHING FILTER
Filed March 16, 1954  4 Sheets-Sheet 3
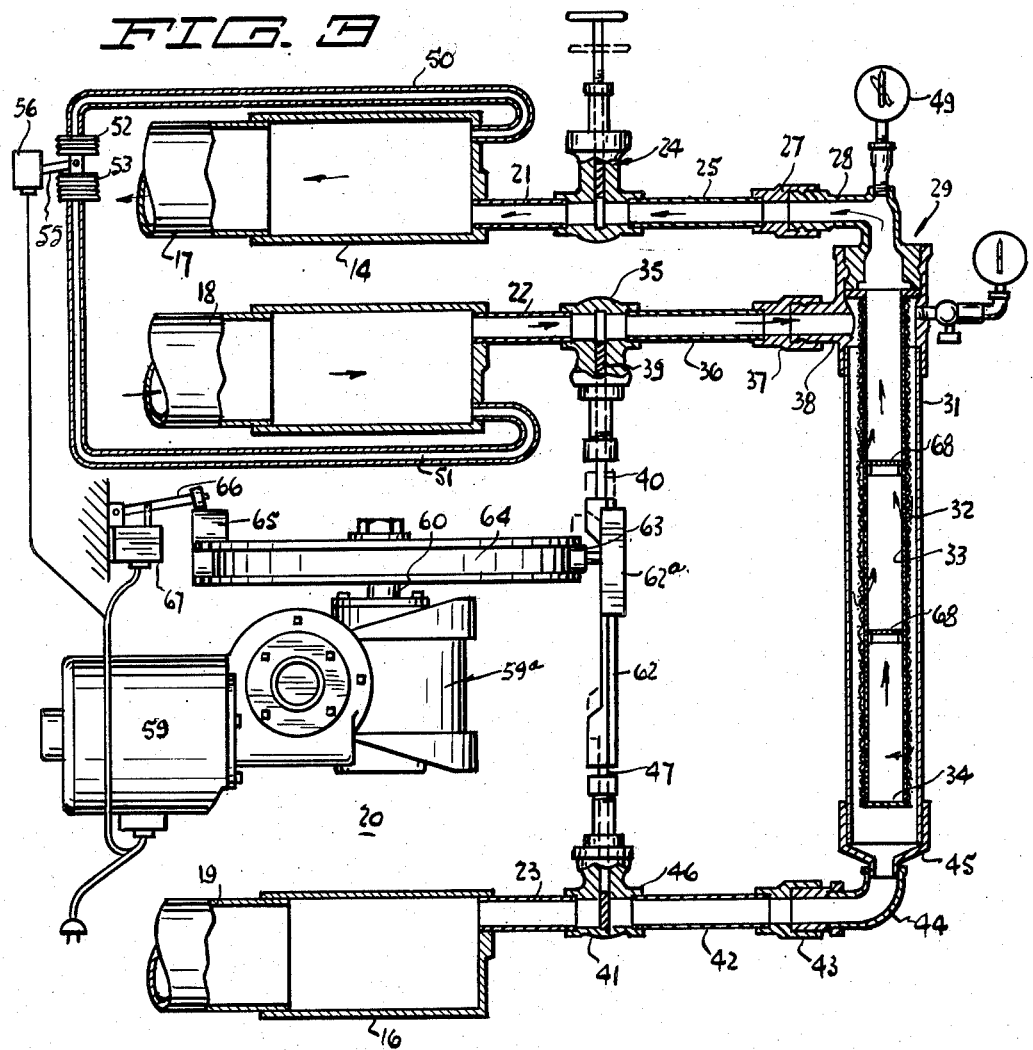
INVENTORS
HELMER A. RONNINGEN
ROBERT M. RONNINGEN
BY WILLIAM J. PETTER
Carlsen & Hazle
ATTORNEYS

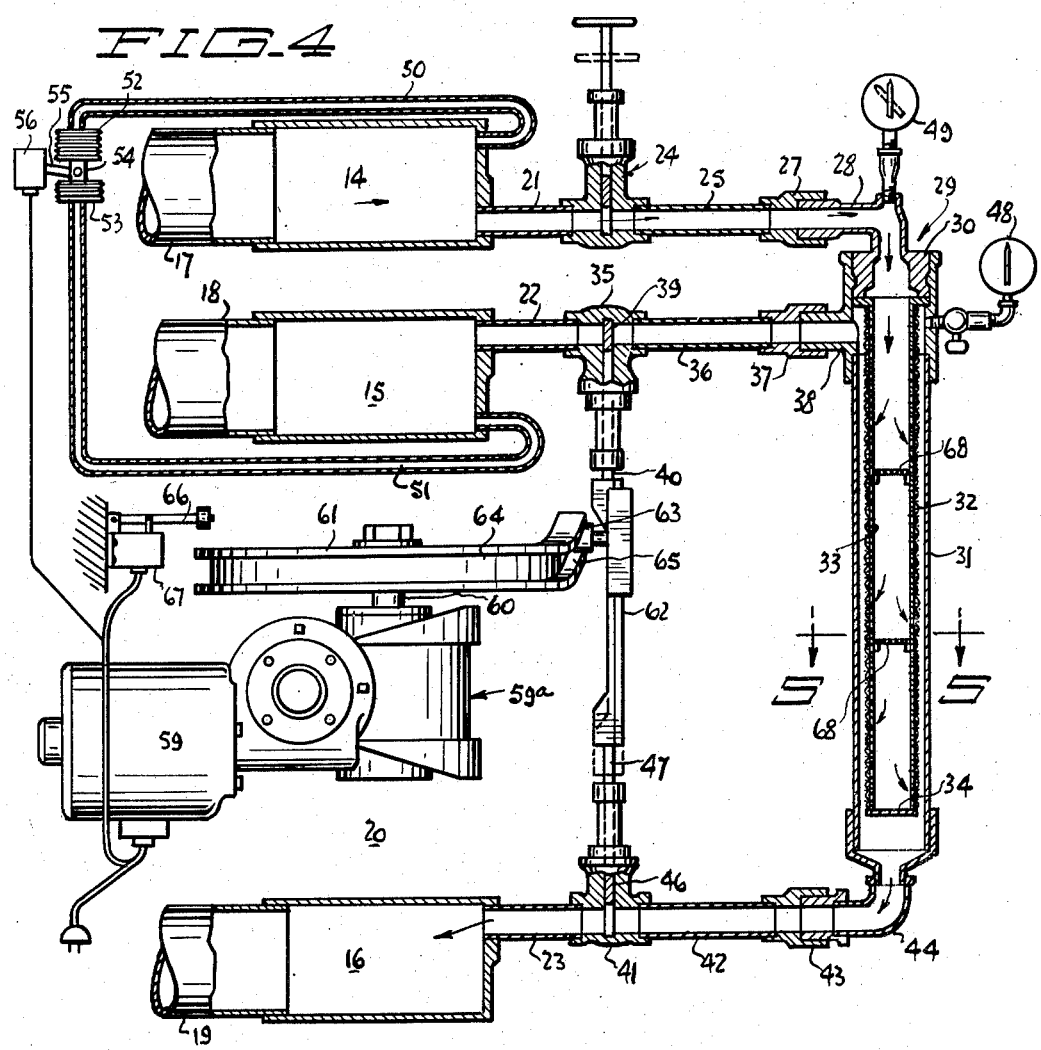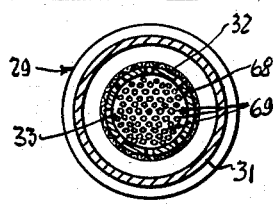

United States Patent Office 2,828,017
Patented Mar. 25, 1958

2,828,017
AUTOMATIC BACKWASHING FILTER

Helmer A. Ronningen, Robert M. Ronningen, and William J. Petter, Vicksburg, Mich.

Application March 16, 1954, Serial No. 416,648

7 Claims. (Cl. 210—102)

This invention relates generally to improvements in filters for filtering out impurities of various kinds from fluids where such fluids are taken from natural bodies of water or streams, by such manufacturers as paper mills and the like, and more particularly relates to an automatic backwashing type of filter for this purpose.

It will be readily appreciated that the amount of impurities in suspension in the fluid will vary a great deal according to the rate of flow of the stream, for example, or the turbulence of a lake or pond due to wind action, and also that filters used for filtering out the impurities will eventually become clogged to the point where they must be cleaned. This is accomplished ordinarily by reversing the direction of flow through the filter media. Heretofore this backwashing, as it is commonly known, has been carried out periodically at given intervals of time. Obviously if the backwashing cycle is adjusted for a condition of great turbulence in the raw fluid the backwashing will be carried out far too often when the fluid becomes more quiescent and when as a result the impurities have a tendency to settle before reaching the filter, and vice-versa. It is extremely desirable that backwashing be carried out strictly according to need and not according to any prescribed series of time increments.

It is accordingly the primary object of our invention to provide an automatic backwashing type of filter in which the differential in line pressure between the incoming unfiltered fluid and the outgoing filtered fluid controls the backwashing action and does so entirely automatically without any attention on the part of an operator. Obviously as the filtering media becomes clogged by impurities the line pressure of the filtered fluid will drop relative to the incoming pressure of the unfiltered fluid and thus by proper preliminary adjustment this differential in pressure, resulting due to clogging of the filter element, may initiate and control an entire backwashing cycle and will carry out the same solely according to need.

Another object of our invention is to provide an automatic backwashing type of filter made up of a plurality of manifolds for carrying not only the incoming unfiltered fluid and outgoing filtered fluid but also the waste fluid used for backwashing, and with provision for the mounting upon these manifolds of a series of individual filter units which are connected by suitable quick, detachable type of couplers and so valve controlled that any individual filter unit may be removed for replacement without shutting down the operation of the filtering machine as a whole. This is a very desirable type of construction in that the filters will obviously become plugged, eventually to the point where they must be taken out and the filtering media replaced, and the use of a considerable number of individual units to provide the necessary total capacity is thus preferable over the use of a single, larger unit the replacement of which would require shutting down the machine for a considerable period of time.

It is a further object of our invention, particularly in conjunction with the construction just set forth supra, to provide a filter unit in which the actual filtering media and its supporting perforated core are soldered in place by solders having a very substantial differential in melting temperatures. It is to be noted that these filter units are completely non-shortcircuiting for the reason that they are soldered in place as will be set forth hereinafter, but the internal and relatively coarsely perforated cores are held in place by a solder having a very high melting temperature and preferably one which would require the use of an oxy-acetylene torch for its removal. The more finely perforated, surrounding filtering media which is the one which actually does the filtering is then held in place by a solder having a relatively low melting temperature so that it can be removed and replaced by the use of a simple blow torch for example, and with no danger whatsoever of causing the core to be separated from the other parts of the unit. In addition to the fact that these filter units are non-shortcircuiting, and that provision is made for the convenient replacement of the filter media without disarrangement of any of the other parts as set forth, it is also found desirable to provide baffles for diverting the backwashing fluid out through the mesh of the filter media as disclosed herein.

These and other more detailed and specific objects will be disclosed in the course of the following specification, reference being had to the accompanying drawings, in which—

Fig. 2 is a sectional view taken substantially along the line 2—2 in Fig. 1 showing only one filter unit, partially broken away, and illustrating the central structure of the machine in elevation.

Fig. 3 is a schematic side elevation of the various manifolds and one filter unit and associated valves, cam operators, etc., and illustrating the conditions of the parts when normal filtering action is taking place.

Fig. 4 is a similar view but illustrating the conditions of the parts when the filter unit therein shown is being cleaned by backwashing.

Fig. 5 is an enlarged cross sectional view through the filter unit taken substantially along the line 5—5 in Fig. 4.

Figure 1:
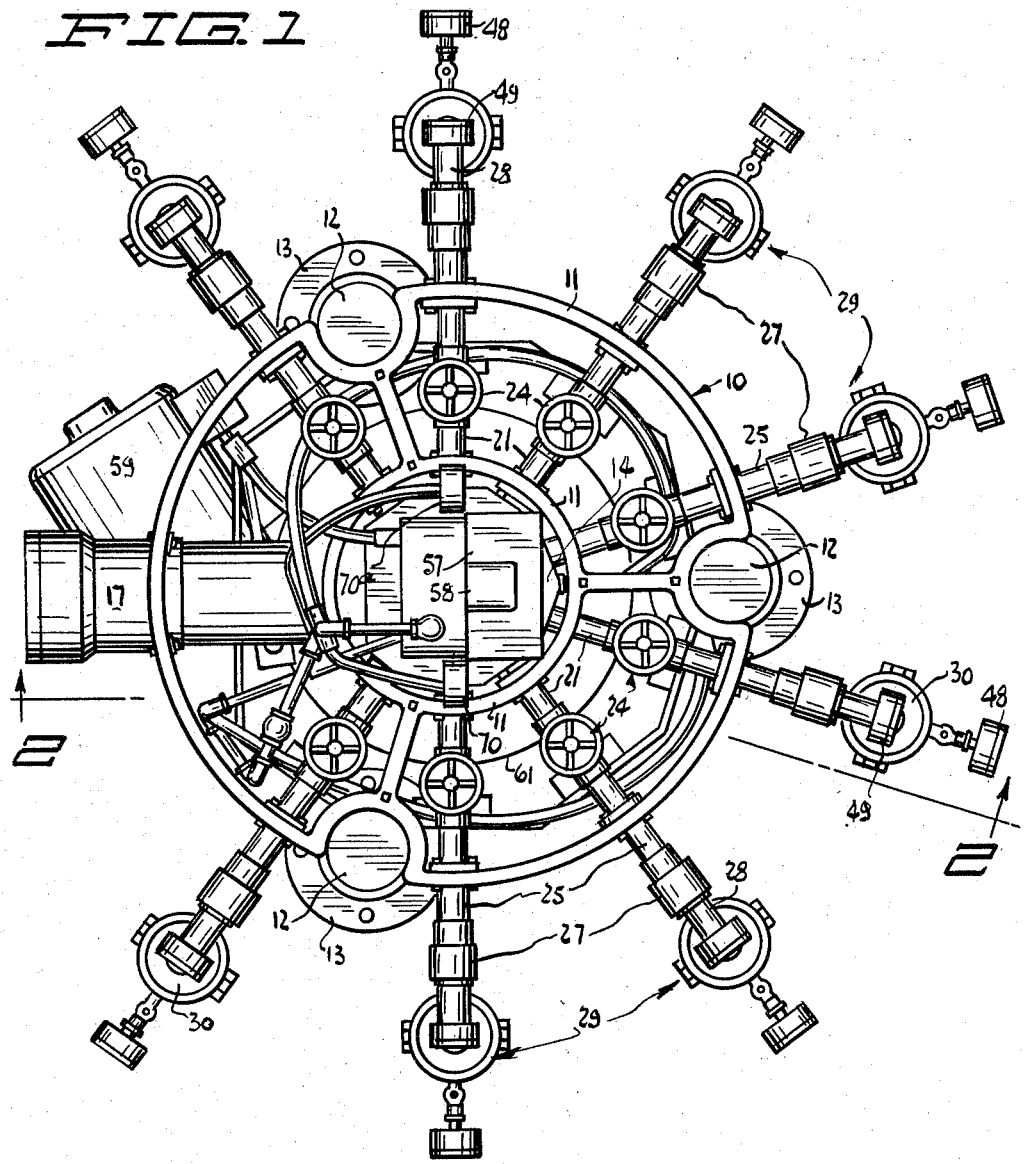
Fig. 1 is a top plan view of an automatic backwashing filter according to our invention, the same being of a type embodying a total of eight individual filter units, with suitable connections to the different manifolds.

Referring now more particularly and by reference characters to the drawing, the filter unit according to our invention comprises a main supporting frame assembly, designated generally at 10, which includes suitably vertically spaced, annular elements, designated throughout at 11, which are carried upon a series of three mounting posts 12 the bases of which are flanged at 13 for mounting the machine upon a suitable supporting surface. There are inner and outer series of such annular elements 11 suitably connected together and the inner series thereof supports vertically superimposed, hollow manifolds 14, 15 and 16 which, because of their operation and use, will be hereinafter referred to as outlet, inlet and waste manifolds. These elements 14–16 are made up of suitably shaped castings and at one side are fitted with large, radially projecting, hollow pipes 17, 18 and 19 by which filtered and unfiltered fluids are lead to and away from the filtering assembly. Thus the pipe 17 is an outlet pipe, 18 is an inlet pipe and 19 is a pipe for carrying waste backwashing fluid away from the machine. In the arrangement here shown the outlet manifold 14 is above the inlet manifold 15 but in close proximity thereto, while the waste manifold 16 is located nearer the bottom of the machine, thus providing a space designated at 20 wherein is located a suitable actuator motor, gear reduction case and cam assembly later to be described.

Each of the manifolds 14 through 16 is provided at circumferentially spaced points, here shown as being eight in number, with suitably tapped openings into which may be screwed pipes 21, 22 and 23 all of which extend radially for a short distance. Each pipe 21 is connected then to an ordinary manually controlled valve 24 and extending therefrom still further radially is another pipe 25 which is affixed to any ordinary type of quick-coupler, designated generally at 27, characterized in that it permits the attachment to the pipe 25 to the outlet 28 of a filter unit, designated generally at 29, or the detachment of said filter unit without the use of any tools while at the same time providing a fluid tight connection when in operation. As clearly shown the filters are arranged in a circle about the vertical center axis of the machine as a whole. Each filter unit 29 includes an end plug 30 removably mounted within an outer cylindrical casing 31 with said plug hollow so that there is communication between the pipe 28 and the interior of said casing. It is to said end plug 30 that the filtering media 32 is secured and as here shown the said media comprises a cylindrical, finely meshed screen which is slipped over an inner, comparatively coarsely perforated core 33 which is closed at the end 34 remote from the plug 30. Thus any fluid taken from the filter through the pipe 28 and from the exterior of the filtering media 32 must flow therethrough with no possibility of shortcircuiting, the latter being ensured by the fact that both the filtering media 32 and the core 33 are soldered in place.

At this point it may be noted that according to our present invention we solder the core 33 to the plug 30 with a silver solder or similar material having a high melting temperature, for example in the neighborhood of 1100 degrees Fahrenheit. On the other hand, the much more finely preforated filter media 32, which is the element which will in time become plugged and will require replacement, is mounted in place by an ordinary solder or similar material having a melting temperature approximating 400 degrees Fahrenheit, for example. Thus it will be readily appreciated that when it becomes time to replace the filter media 32 this may be accomplished by the heat generated, for example, by an ordinary blow torch and without disturbing the mounting of the core 33 due to the difference in melting temperature of the solders used, and if it is necessary to replace the latter element the use of some such device as an oxy-acetylene torch is required.

Each pipe 22 is connected to an inlet control valve of conventional variety, designated at 35, from which there then extends still further a radially extending pipe 36 which is connected by another quick-coupler 37 to the inlet nipple 38 of the filter unit 29. In the present instance the valve 35 is of the type in which the valve gate 39 slides in a vertical direction, under control of a stem 40 which extends downwardly for a purpose presently to appear. Likewise each pipe 23 is connected to a waste valve 41 from which there extends still further radially another pipe 42 which is connected by another quick-coupler 43 to an elbow 44 secured to the bottom 45 of the filter unit 29. Here again the valve 41 is of the type in which the gate 46 slides vertically for opening and closing the passageway through the valve, but in this case the stem 47 for actuating said gate extends in an upward direction.

As stated, there are eight of the filter units 29 all of identical construction located in peripherally spaced positions about the vertical axis of the machine and similar reference characters are used throughout to denote corresponding parts of each individual unit. We do not, of course, limit ourselves to this precise number of filter units and more or less may be used according to the total volumetric capacity required of the filter. In any event, it will be readily understood that for normal operation the valves of each of the filter units will be positioned as shown in Fig. 3, that is that only the valve 41 will be closed and that, therefore, the incoming unfiltered fluid will enter through the pipe 18 into the manifold 15, from whence it will be distributed through the valves 35 to the various filtering units. This unfiltered fluid must flow inwardly, as indicated by the arrows, through the filtering media 32 of the filter units and in doing so it will be cleansed of its impurities, etc., which will be retained on filter media and fall to the bottom of the filter units and collect in the waste pipes 42 and elbows 44 and bottom 45. The filtered fluid will then flow inwardly through the valves 24, into the outlet manifold 14 and thence into the outlet line 17 for such use as may be required. An inlet individual line pressure gauge 48 is connected into the casing 31 of each filter unit so that the pressure of the incoming unfiltered fluid may be observed at any time at each filter unit and there is a corresponding outlet or filter pressure indicating gauge 49 tapped into the pipe 28 for reading the line pressure of the filtered fluid at each filter unit.

As stated hereinbefore it has been customary in filters used for purposes of which our filter is adapted to provide for backwashing the filtering media by reversing the direction of flow of fluid therethrough. Obviously impurities will collect upon the outside of the filtering media 32, for example, and the majority of these will be dislodged merely by reversing the flow so that instead of fluid flowing inwardly it will be driven outwardly in a radial direction. The difficulty, however, has arisen in properly timing this backwashing operation according to need therefor, and because of the varying characteristics of the unfiltered fluid entering the machine. It will be readily appreciated that where the fluid is being taken from a lake or pond the turbulence of the water, as induced by wave action, will have a considerable bearing upon the amount of impurities held in suspension in the water and entering the filter. Many attempts have been made to preset a time cycle of backwashing operations but unless such cycle is continuously or at least regularly varied according to need, which would of course require the attention of an operator, then in many cases the filter would be found to be running when backwashing was desperately needed or, conversely, backwashing operations would be carried out far more often than is necessary. According to our invention we remove the time element entirely from consideration and automatically backwash the filter as a function of the natural differential in line pressures which occur between the inlet and outlet lines or supports as the filtering media becomes clogged. It is quite obvious that as the filters plug up in the course of time the amount of fluid which the filters can pass will be reduced and therefore the pressure in the outlet manifold 14 will become reduced in comparison to the pressure of the incoming unfiltered fluid in the manifold 15. As best shown schematically in Figs. 3 and 4 we connect operating tubes 50 and 51 to the manifolds 14 and 15 so that fluids from the manifolds will flow through these lines to the opposed bellows 52 and 53 of a conventional pressure differential switch. Thus the bellows 52—53 will be differentially expanded and contracted according to the differential in pressures in the manifolds 14 and 15, and connected between the bellows is a tie rod 54 to which is pivoted the lever arm 55 of a control switch 56. As stated, this switch and bellows assembly is wholly conventional and any desired type of pressure differential or pressure sensing switching system may be employed as may be desired. As seen in Figs. 1 and 2 there is a panel 57 projecting upwardly at the upper center of the filter unit as a whole upon which among other things there is a main control switch 58 and also upon which the aforesaid switch 56 is mounted. Obviously the aforesaid operator lines 50—51 will require suitable elbows and connections for properly connecting them between the manifolds and the operating elements for switch 56, but since this arrangement may vary so widely according to need these detailed parts are not set forth herein.

The switch 56 is connected in a suitably arranged electrical circuit for initiating the operation of an electric motor 59 supported from the frame 10 in the space 20 aforesaid and connected through a suitable transmission 59a to a vertical shaft 60 operating a circular cam 61. The axis of rotation of the shaft 60 is centered with respect to the circle of filter units and valves and particularly with regard to the valve stems 40—47. Each set of stems 40—47 is connected by a suitable tie member 62 so that the stems must operate in unison for each pair of valves 35 and 41 at each of the individual filter units, all of said tie members sliding in suitable guides 62a supported from the frame 10. Furthermore, from each of said tie elements or carriers 62 there inwardly projects a cam roller 63 operating in a peripheral camway 64 in the cam 61. At one point the said camway 64 has a raised portion or high spot 65 and when the same reaches any one of the rollers 63 of the individual filter unit assemblies it will move said roller and the connected tie element 62 in an upward direction, therefore closing the valve 35 and opening the valve 41, moving the gates 39 and 46 to the position shown in Fig. 4. Normally, however, the raised portion 65 of the camway 64 rests in the position shown in Fig. 3 at which point it upwardly operates the lever 66 of a conventional lever limit switch 67 which is also connected in circuit with the motor 59.

The arrangement is such that when the pressure in the outlet manifold 14 drops below a pre-determined value relative to the pressure in the inlet manifold 15, due to the clogging of the filters, the resulting pressure differential will so operate the switch 56 as to set the motor 59 in operation, whereupon the cam 61 will slowly rotate and the raised portion 65 of the camway 64 will move in succession into engagement with the rollers 63 of the various filter unit assemblies located about the axis of rotation. Thus each filter unit will have the direction of flow of fluid through it reversed in succession, for the reason that the elevation of the rollers 63 and resulting upward motion of the valve stems 40—47 will close the valves 35 and open the valves 41. This operation shuts off the inlet flow of unfiltered fluid and causes previously filtered fluid to return through the valves 24 to the interior of the cores 33, from which the fluid will be diverted outwardly to blow the collected impurities from the filtering media 32, and the water carrying these impurities (and those which had previously collected) will be directed out through the valves 41 and manifold 16 to waste by the pipe 19. The backwashing is further facilitated by the provision of a series of baffle disks 68 within the core members 33 at vertically spaced points to divert some of the fluid outward through the filtering media 32 over its entire length, said baffles having a series of coarse perforations, as designated at 69 in Fig. 5. As the raised portion of the camway 64 travels past its alignment with the rollers 63 it will return the same in a downward direction to restore the valves to the normal operating position of Fig. 3, that is it will open the valves 35 and reclose the waste valves 41 in succession for each individual filter. The cam will make a complete revolution in carrying out this successive backwashing of the individual filter units and as the raised portion of the cam again moves under the lever 66, above the limit switch 67, the latter will shut off the motor 59 leaving the entire assembly in its initial operating condition. Thus it will be seen that it is solely the differential in pressures of the filtered and unfiltered fluids which controls the backwashing cycle so that backwashing, or blow down of the filter as it is sometimes called, will be carried out according to need without the attention of an operator for the purpose.

Separate pressure indicating gauges 70—70a are tapped into the lines leading to the differential pressure switch 56 so that the overall differential in filtered and unfiltered fluid pressures may be observed at any time for comparison with the individual pressures of these fluids, as indicated by the aforesaid gauges 48—49 at each filter unit.

As stated hereinbefore, all of the individual filter units 29 are arranged for quick connection to or disconnection from the overall filter assembly by the use of the quick-couplers 27, 37 and 43. For this purpose it is only necessary for an operator to manipulate the switch 58 so that it overrides the switches 56—67 and causes the cam 61 to turn until the raised portion 65 of the camway comes into alignment with the filter unit to be removed. This operation closes the inlet valve 35 and opens the waste valve 41. Also the operator will then close the outlet valve 24 so that return flow of filtered fluid is shut off, whereupon the individual filter unit will quickly drain and the pressures will drop to zero so that it can be removed without in any way influencing the operation of the remainder of the system. When the filter unit has been replaced the operator then returns the cam 61 to its normal position by again manipulating switch 58 while he also re-opens the outlet valve 24 and the replaced filter is returned to the filtering circuit. It is to be noted that there is no necessity whatsoever for shutting down the filter nor need any tools be used for this operation because of the quick-couplers used as the connections between the individual filter units and the remainder of the filter system. The openings or perforations 69 in the baffles 68 are larger in the upper baffles than in the lower, thus to better apportion the volume of backwashing water along the full length of the filter media.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. In an automatic backwashing fluid filter of the character described, the combination comprising centrally arranged superimposed manifolds arranged on an upright axis for respectively carrying filtered fluid, unfiltered fluid and waste fluid used for backwashing the filter, a series of radially extending connections emanating from each of said manifolds, a series of individual filtering units connected to said connections and arranged on a circle centered on said axis, separate valves in said connections normally closing the waste manifold off but connecting the other manifolds to the filtering units so that fluid will be distributed to and filtered in said units, the valves in the connections leading from the unfiltered and waste fluid manifolds to each filtering unit being connected together for simultaneous but opposite operation, a cam element rotatable on said axis for operating these valves in succession for the individual filtering units closing off the unfiltered fluid manifolds from the filtering units while opening the connections to the waste manifolds whereby the fluid flow through the filtering units will be reversed for a period of time, and means for operating the said cam element in response to an increasing drop in fluid pressure in the filtered fluid manifold as compared to the fluid pressure in the unfiltered fluid manifold.

2. An automatic backwashing fluid filter of the character described, comprising manifolds arranged on an upright axis and adapted for respectively carrying filtered fluid, unfiltered fluid and waste fluid used for backwashing the filter, a series of radially extending connections emanating from each of said manifolds, a series of individual filtering units connected to said connections and arranged in a circle centered on said axis, separate valves in said connections normally closing the waste manifold off but connecting the other manifolds to the filtering units so that fluid will be distributed to and filtered in said units, the valves in the connections leading from the unfiltered and waste fluid manifolds to each filtering unit being connected together for simultaneous but opposite operation, a cam element rotatable on said axis and operative for operating these valves in succession for the individual filtering units closing off the unfiltered fluid manifolds from the filtering units while opening the connections to the waste manifolds whereby the fluid flow through the filtering units will be reversed for a period of time, means for operating the said cam element comprising an electric motor, and a pressure sensing switch connected to the filtered and unfiltered fluid manifolds for starting the motor and causing the cam element to make one complete revolution when the pressure in the filtered fluid manifold drops below that in the unfiltered fluid manifold to a predetermined degree.

3. An automatic backwashing fluid filter of the character described, comprising a series of stacked manifolds arranged on a vertical axis for respectively carrying filtered fluid, unfiltered fluid and waste fluid used for backwashing the filter, a series of radially extending connections emanating from each of said manifolds, a series of individual filtering units connected to said connections and arranged in a circle centered on said axis, separate valves in said connections normally closing the waste manifold off but connecting the other manifolds to the filtering units so that fluid will be distributed to and filtered in said units, the valves in the connections leading from the unfiltered and waste fluid manifolds to each filtering unit being connected together for simultaneous but opposite operation, a cam element rotatable on said axis for operating these valves in succession for the individual filtering units closing off the unfiltered fluid manifolds from the filtering units while opening the connections to the waste manifolds whereby the fluid flow through the filtering units will be reversed for a period of time, means for operating the said cam element comprising an electric motor, a pressure sensing switch connected to the filtered and unfiltered fluid manifolds for starting the motor and causing the cam element to make one complete revolution when the pressure in the filtered fluid manifold drops below that in the unfiltered fluid manifold to a predetermined degree, and a limit switch operative on completion of one turn of the cam element to stop the said motor.

4. An automatic backwashing fluid filter of the character described, comprising a series of manifolds arranged on an upright axis for respectively carrying filtered fluid, unfiltered fluid and waste fluid used for backwashing the filter, a series of radially extending connections emanating from each of said manifolds, a series of individual filtering units connected to said connections and arranged in a circle centered about said axis, separate valves in said connections normally closing the waste manifold off but connecting the other manifolds to the filtering units so that fluid will be distributed to and filtered in said units, the valves in the connections leading from the unfiltered and waste fluid manifolds to each filtering unit being connected together for simultaneous but opposite operation, a cam element rotatable on said axis for operating these valves in succession for the individual filtering units closing off the unfiltered fluid manifolds from the filtering units while opening the connections to the waste manifolds whereby the fluid flow through the filtering units will be reversed for a period of time, means for operating the said cam element comprising an electric motor, a pressure sensing switch connected to the filtered and unfiltered fluid manifolds for starting the motor and causing the cam element to make one complete revolution when the pressure in the filtered fluid manifold drops below that in the unfiltered fluid manifold to a predetermined degree, and a limit switch operative on completion of one turn of the cam element to stop the said motor, and a manually operative switch for overriding the pressure sensing and limit switches when one of the filtering units is to be removed for servicing or replacement.

5. A filter of the character described, comprising a plurality of individual filter units each having an inlet for unfiltered fluid and outlet for filtered fluid and a waste outlet for fluid used in backwashing the filter unit to clean it, separate tubular connections leading from these inlets, outlets and waste outlets of the filter units to respectively receive fluid to be filtered, direct away filtered fluid and dispose of waste fluid, a normally open manually operative valve in each of said connections leading from the outlets of the respective filter units, a normally open automatically operative valve in each of said connections to the inlets of the respective filter units, a normally closed automatically operative valve in each of the connections to the waste outlets of the respective filter units, and means operative automatically in response to a decrease in pressure of fluid issuing from said outlet connections and including a single cam operative to temporarily reversely position the said automatically operative valves of each of the filter units in succession to backwash the filter units.

6. A filter of the character described, comprising a plurality of individual filter units each having an inlet for unfiltered fluid and outlet for filtered fluid and a waste outlet for fluid used in backwashing the filter unit to clean it, separate tubular connections leading from these inlets, outlets and waste outlets of the filter units to respectively receive fluid to be filtered, direct away filtered fluid and dispose of waste fluid, a normally open manually operative valve in each of said connections leading from the outlets of the respective filter units, a normally open automatically operative valve in each of said connections to the inlets of the respective filter units, a normally closed automatically operative valve in each of the connections to the waste outlets of the respective filter units, and means operative automatically in response to a decrease in pressure of fluid issuing from said outlet connections to reversely position the automatically operative valves of any filter unit so that the valve in the inlet connection is closed and the valve in the waste outlet opened to backwash that filter unit, and releasable connections between all of said valves and their respective filter units whereby with the automatically operative valves so reversely positioned for any filter unit and the manually operative valve to the same filter unit closed the unit may be removed entirely while the remaining filter units remain in operation.

7. A filter of the character described, comprising a plurality of individual filter units each having an inlet for unfiltered fluid and outlet for filtered fluid and a waste outlet for fluid used in backwashing the filter unit to clean it, separate tubular connections leading from these inlets, outlets and waste outlets of the filter units to respectively receive fluid to be filtered, direct away filtered fluid and dispose of waste fluid, a normally open manually operative valve in each of said connections leading from the outlets of the respective filter units, a normally open automatically operative valve in each of said connections to the inlets of the respective filter units, a normally closed automatically operative valve in each of the connections to the waste outlets of the respective filter units, a normally closed automatically operative valve in each of the connections to the waste outlets of the respective filter units, and means operative automatically in response to a decrease in pressure of fluid issuing from said outlet connections to reversely position the automatically operative valves of any filter unit so that the valve in the inlet connection is closed and the valve in the waste outlet opened to backwash that filter unit, releasable connections between all of said valves and their respective filter units whereby with the automatically operative valves so reversely positioned for any filter unit and the manually operative valve to the same filter unit closed the unit may be removed entirely while the remaining filter units remain in operation, the said means for operating the valves including a motor driven element, a pressure sensing switch operative to cause said motor driven element to backwash all of said filter units in succession, and a manually operative switch connected to override the pressure sensing switch to stop said element while a filter unit is removed.

References Cited in the file of this patent

UNITED STATES PATENTS

| | | |
|---|---|---|
| 629,942 | Wanner | Aug. 1, 1899 |
| 654,783 | Cole | July 31, 1900 |
| 837,658 | Bayley | Dec. 4, 1906 |
| 1,601,437 | Gustafson | Sept. 28, 1926 |
| 1,661,676 | Norquist | Mar. 6, 1928 |
| 1,759,636 | Turner | May 20, 1930 |
| 1,870,381 | Piper | Aug. 9, 1932 |
| 2,035,758 | Pierce | Mar. 31, 1936 |
| 2,183,577 | McNeal | Dec. 19, 1939 |
| 2,184,618 | Lawlor | Dec. 26, 1939 |
| 2,366,903 | Harms et al. | Jan. 9, 1945 |
| 2,441,526 | Zollinger | May 11, 1948 |
| 2,526,372 | Le Clair | Oct. 17, 1950 |
| 2,656,927 | Prendergast | Oct. 27, 1953 |

FOREIGN PATENTS

| | | |
|---|---|---|
| 404,309 | Great Britain | Jan. 12, 1934 |